UNITED STATES PATENT OFFICE.

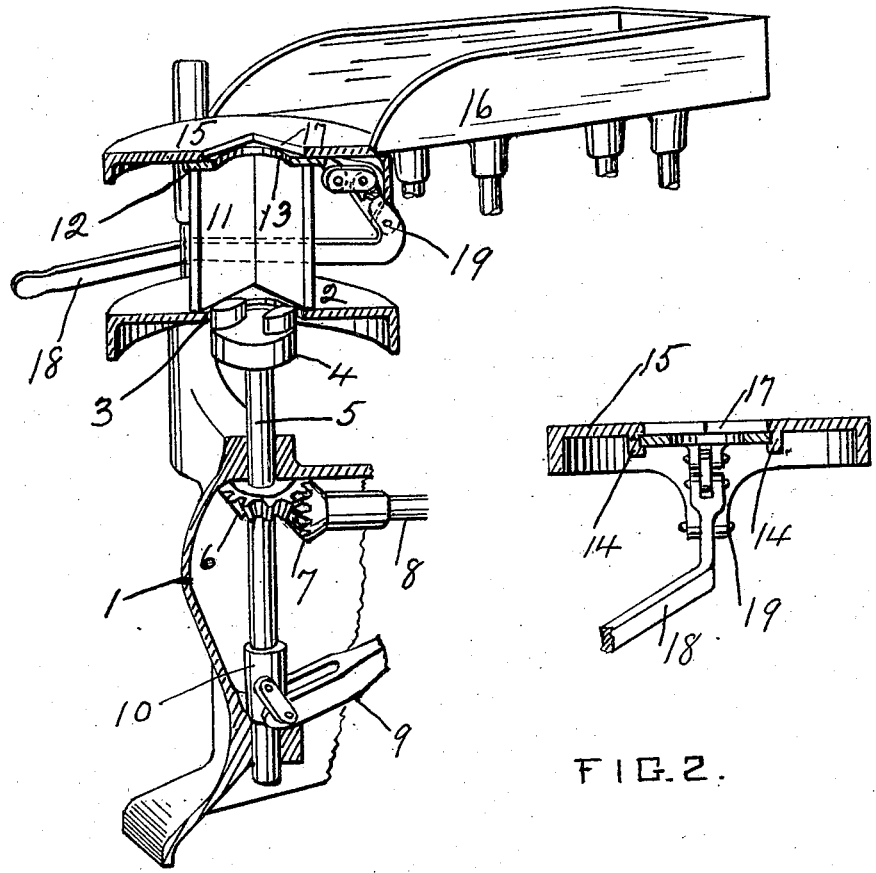

CHARLES A. STEWARD, OF PLANO, ILLINOIS.

MOLD FOR CONCRETE MACHINES.

1,419,699.  Specification of Letters Patent.  Patented June 13, 1922.

Application filed October 3, 1921. Serial No. 504,997.

*To all whom it may concern:*

Be it known that I, CHARLES A. STEWARD, a citizen of the United States, residing at Plano, in the county of Kendall and State of Illinois, have invented certain new and useful Improvements in Molds for Concrete Machines, of which the following is a specification.

The invention relates to that part of a molding machine into which the mixture is introduced, and has particular reference to the construction of the upper end of the mold, the object being to facilitate the feeding operation, to insure the complete filling of the mold cavity and to speed the molding.

The invention is especially useful when applied to molds having angular recesses and in which a rotary packer is forced upward through the center of the mold and through the aligned circular feeding orifice in the upper or resistance plate which, in machines as at present constructed, is too small to admit of rapid feeding of the mixture, its diameter being necessarily limited to about that of the rotary packer, as will be readily understood; and the improvement which I have devised comprehends a modification of this upper or resistance plate and its associated parts, whereby the feeding capacity of the machine is increased without interfering with the normal functioning of the parts when the mixture is being packed in the cavity of the mold.

In my improved machine, the resistance plate is not, as heretofore, fixed to the body of the mold while the mixture is being supplied to the mold cavity, but is previously moved away from the top of the mold, in a preferably horizontal direction, to thereby expose an increased cross-sectional area of the mold cavity, so that the mixture may be introduced in full volume and with great rapidity, thus quickening the work and increasing the capacity of the machine. If the resistance plate is formed in a single piece, a single actuating device may be employed for moving it to and from its operative position at the top of the mold.

The invention will be best understood by reference to the accompanying drawing, constituting a part of this specification, in which:—

Figure 1 is a sectional perspective view showing a concrete molding machine embodying the invention; and Figure 2 is a sectional view of the improved parts.

Referring to the drawing, 1 is the frame of the machine on which the several parts are mounted. This frame is provided at its upper end with a molding table, 2, having a central opening, 3, for the reception of the rotary packer, 4, which is of the usual construction, said packer being mounted on the top of a vertically movable shaft, 5, to which a rotary movement is imparted by gears, 6, 7, actuated by a driving shaft, 8. A lever, 9, linked to a sleeve, 10, in which the lower end of the shaft, 5, is rotatably mounted, imparts to said shaft its vertical movements, as required. These features of construction, however, constitute no part of the present invention.

The mold box, 11, which may be of the usual angular form, is supported by the table, 2, and is made removable so that it may be replaced by another mold box after the mixture therein has been compressed into its proper form. At the top of the mold box, 2, is a movable resistance plate, 12, which is provided with a circular opening, 13, for the passage of the rotary packer, 4, when it is completing the compression of a charge of the concrete mixture, said resistance plate being mounted in guides, 14, 14, on the under side of a feeding table, 15, suitably supported on the frame, 1, in substantially the plane of the underside of the feed trough, 16, to allow said resistance plate to slide under said trough. The feeding table, 15, has an opening, 17, substantially conforming in shape and size to the mold box, 11, and this opening constitutes the actual feeding orifice of the machine, the circular orifice, 13, of the resistance plate, 12, being no longer used as a feeding orifice. A lever, 18, pivoted at, 19, and linked to the resistance plate, 12, is used to actuate said plate.

The feed opening, 17, is not only considerably larger than the opening, 3, in the resistance plate, 2, which has heretofore been employed as a feed opening, but is of such shape as to allow the mixture to directly enter the angular portions of the mold, thereby avoiding the formation of voids in the finished product and ensuring uniform densities in all parts thereof.

It is immaterial how the resistance plate, 12, is supported provided it is so mounted as to withstand the thrust of the rotary packer, 4, while it is packing the charge, and the feeding table, 15, is a material element of the machine only as respects its function of facilitating the hand operation of pushing the mixture into the open mouth of the mold box, 11, and preventing the dropping of particles on the floor. The molds employed may be other than angular, although the invention is especially useful in connection with molds of that type into the corners of which it is difficult to force the mixture unless the top of the mold box is freely open.

Having thus described my invention what I claim, and desire to patent is:

1. A molding machine having in combination a mold box, a rotary packer, and a movable resistance plate provided with an opening of substantially the diameter of said packer, said plate being adapted to uncover the mold box while it is being charged.

2. A molding machine having in combination a mold box, a rotary packer, a feed table having an opening conforming substantially in shape and size to the shape and size of the mold box, and a resistance plate disposed below said feed table and having an opening for the passage of the rotary packer.

3. A molding machine having in combination a mold box, a rotary packer, a feed table having an opening conforming substantially in shape and size to the shape and size of the mold box, guides on said feed table, and a resistance plate movable in said guides.

4. A molding machine having in combination a mold box, a feed table having an opening approximating in size the cross-sectional area of the mold box, and a horizontally-movable resistance plate having an opening of less area than that of the mold box adapted to cover and uncover the mold box.

5. A molding machine having in combination a feed table provided with an opening, and a horizontally movable resistance plate provided with an opening of less area than that of the feed table.

In testimony whereof I affix my signature.

CHARLES A. STEWARD.